(12) United States Patent
Gandarillas et al.

(10) Patent No.: US 11,650,089 B2
(45) Date of Patent: May 16, 2023

(54) APPARATUS AND METHOD FOR MEASURING FLUID FLOW PARAMETERS

(71) Applicant: Expro Meters, Inc., Wallingford, CT (US)

(72) Inventors: Carl J. Gandarillas, Beacon Falls, CT (US); Mark E. Sasso, Waxhax, NC (US); Changjiu Dang, Cheshire, CT (US); Daniel L. Gysling, South Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 363 days.

(21) Appl. No.: 16/926,184

(22) Filed: Jul. 10, 2020

(65) Prior Publication Data

US 2021/0010841 A1    Jan. 14, 2021

Related U.S. Application Data

(60) Provisional application No. 62/872,382, filed on Jul. 10, 2019.

(51) Int. Cl.
  *G01F 1/34*    (2006.01)
  *G01F 1/86*    (2006.01)
  (Continued)

(52) U.S. Cl.
  CPC .............. *G01F 1/7082* (2013.01); *B32B 1/08* (2013.01); *G01F 1/34* (2013.01); *G01F 1/845* (2013.01); *G01F 1/86* (2013.01); *G01L 9/08* (2013.01)

(58) Field of Classification Search
  None
  See application file for complete search history.

(56) References Cited

U.S. PATENT DOCUMENTS 6,354,147 B1    3/2002    Gysling
6,587,798 B2    7/2003    Kersey
(Continued)

FOREIGN PATENT DOCUMENTS

DE    102013101950 A1    11/2013
WO    0133648 W    5/2001

OTHER PUBLICATIONS

Kunadt et al. "Ultrasound Flow Sensor Based on Arrays of Piezoelectric Transducers Integrated in a Composite", Procedia Materials Science, vol. 2, No. 2, Mar. 22, 2013, pp. 160-165.
(Continued)

*Primary Examiner* — Herbert K Roberts
(74) *Attorney, Agent, or Firm* — Getz Balich LLC

(57) ABSTRACT

An apparatus for measuring a parameter of a fluid flow passing within a pipe is provided. The apparatus includes a sensing device and a processing unit. The sensing device has a sensor array that includes at least one first macro fiber composite (MFC) strain sensor disposed at a first axial position, and at least one second MFC strain sensor disposed at a second axial position. The first axial position and the second axial position are spaced apart from one another. The at least one first MFC strain sensor and the at least one second MFC strain sensor are both configured to produce signals representative of pressure variations of the fluid flow passing within the pipe. The processing unit is configured to receive the signals from the sensor array and measure one or more fluid flow parameters based on the signals.

6 Claims, 10 Drawing Sheets

(51) Int. Cl.
    *G01L 9/08*     (2006.01)
    *G01F 1/7082*     (2022.01)
    *B32B 1/08*     (2006.01)
    *G01F 1/84*     (2006.01)

(56) References Cited

U.S. PATENT DOCUMENTS

| | | |
|---|---|---|
| 6,609,069 B2 | 8/2003 | Gysling |
| 6,732,575 B2 | 5/2004 | Gysling |
| 7,032,432 B2 | 4/2006 | Gysling |
| 7,058,549 B2 | 6/2006 | Gysling |
| 7,062,976 B2 | 6/2006 | Gysling |
| 7,359,803 B2 | 4/2008 | Gysling |
| 2004/0226386 A1* | 11/2004 | Gysling ................ G01F 1/7082 73/861.42 |
| 2019/0301279 A1* | 10/2019 | Gao ........................ E21B 47/18 |
| 2019/0346335 A1* | 11/2019 | Youcef-Toumi .......... G01L 1/06 |

OTHER PUBLICATIONS

International search report for PCT/US2020/041641 dated Oct. 21, 2020.

\* cited by examiner

APPARATUS AND METHOD FOR MEASURING FLUID FLOW PARAMETERS

The present application is entitled to the benefit of and incorporates by reference essential subject matter disclosed in U.S. Provisional Patent Application Ser. No. 62/872,382, filed Jul. 10, 2019.

BACKGROUND OF THE INVENTION

1. Technical Field

The present disclosure relates to an apparatus for determining one or more parameters of a homogeneous or non-homogeneous fluid flowing within a conduit.

2. Background Information

Numerous technologies have been implemented to measure fluid flow parameters such as flow velocity, volumetric flow rate, and mass flow rate of fluids in industrial processes. Some of the more common approaches are based upon ultrasonic time of flight and/or Doppler effects, Coriolis effects, rotating wheels, electromagnetic induction, and pressure differentials. Each of these techniques has certain drawbacks. For example, invasive techniques that rely on insertion of a probe into the flow, or geometry changes in the pipe, may be disruptive to the process and prone to clogging. Other methods such as ultrasonics may be susceptible to entrained gases or flow stratification. Meters that use rotating wheels or moving parts are subject to reliability issues. Coriolis meters are intrusive and limited by multiphase flow effects and pipe size limitations.

U.S. Pat. No. 7,058,549 describes an apparatus and method for measuring unsteady pressures in a pipe. The apparatus includes piezoelectric film (PVDF) sensors mounted on a stainless steel strap that is clamped to the exterior of a pipe. The sensors are disposed in an array and are configured to sense unsteady pressures associated with vortical and/or other disturbances traveling within a fluid passing through the pipe, and/or acoustical disturbances traveling within the pipe. The unsteady pressures are analyzed to determine a fluid flow parameter such as volumetric flow rate or process fluid sound speed. For measuring a convective velocity, the aforesaid apparatus works very well under most fluid flow conditions.

However, under certain low flow velocity circumstances (e.g., liquid flow velocities as low as three feet per second (3 f/s), gas flow velocities as low as fifteen feet per second (15 f/s), etc.), the aforesaid apparatus may not be able to produce accurate results.

What is needed, therefore, is a fluid flow sensing apparatus that performs well for a variety of different velocity fluid flows traveling within a pipe.

SUMMARY

According to an aspect of the present disclosure, an apparatus for measuring one or more parameters of a fluid flow passing within a pipe is provided. The pipe has an outer radial surface and a circumference. The apparatus includes a sensing device and a processing unit. The sensing device includes a sensor array that has at least one first macro fiber composite (MFC) strain sensor disposed at a first axial position, and at least one second MFC strain sensor disposed at a second axial position. The first axial position and the second axial position are spaced apart from one another. The at least one first MFC strain sensor and at least one second MFC strain sensor are both configured to produce signals representative of pressure variations of the fluid flow passing within the pipe. Each first MFC sensor and each second MFC sensor has a first sensitivity along a first axis and a second sensitivity along a second axis, which second axis is orthogonal to the first axis, and the second sensitivity is substantially less than the first sensitivity. The sensing device is configured for attachment to the pipe outer radial surface so that the at least one first MFC strain sensor and the at least one second MFC strain sensor each have their respective first axis substantially aligned with the circumference of the pipe. The processing unit is configured to receive the signals from the at least one first MFC strain sensor and the at least one second MFC strain sensor sensing device, and measure the one or more fluid flow parameters based on the signals.

In any of the aspects or embodiments described above and herein, the sensing device may include a strap unit disposed radially outside of the array of sensors.

In any of the aspects or embodiments described above and herein, the sensing device may include an adhesive operable to attach the at least one first MFC strain sensor and the at least one second MFC strain sensor to a surface of the strap unit.

In any of the aspects or embodiments described above and herein, the strap unit may be configured to clamp the sensing device to the pipe outer radial surface.

In any of the aspects or embodiments described above and herein, the sensing device may include an adhesive operable to attach the at least one first MFC strain sensor and the at least one second MFC strain sensor to the pipe outer radial surface.

In any of the aspects or embodiments described above and herein, the sensing device may be configured for attachment to the pipe outer radial surface so that the at least one first MFC strain sensor and the at least one second MFC strain sensor are subjected to compressive strain.

In any of the aspects or embodiments described above and herein, the sensing device may have a laminate body that includes a stack of layers including a sensor layer that includes the sensor array, and the laminate body has a neutral axis, and the sensing device may be configured for attachment to the pipe outer radial surface so that the sensor layer is disposed within the laminate body between the neutral axis and the pipe outer radial surface.

In any of the aspects or embodiments described above and herein, the laminate body may include an inner most layer, and the sensing device may be configured for attachment to the pipe outer radial surface so that the inner most layer is contiguous with the pipe outer radial surface, and the sensing device may be configured so that the inner most layer is releasable from the pipe outer radial surface with the sensing device in an undamaged form.

According to another aspect of the present disclosure, an apparatus for measuring one or more parameters of a fluid flow passing within a pipe is provided. The pipe has an outer radial surface and a circumference. The apparatus includes a sensing device and a processing unit. The sensing device includes a sensor array disposed within a laminate body having a stack of layers. The sensor array is disposed within a sensor layer of the stack of layers. The laminate body has a neutral axis. The sensor array includes at least one first macro fiber composite (MFC) strain sensor disposed at a first axial position, and at least one second MFC strain sensor disposed at a second axial position. The first axial position and the second axial position are spaced apart from one another. The at least one first MFC strain sensor and at least one second MFC strain sensor are both configured to produce signals representative of pressure variations of the fluid flow passing within the pipe. The sensing device is configured for attachment to the pipe outer radial surface so that the sensor layer is disposed within the laminate body between the neutral axis and the pipe outer radial surface. The processing unit is configured to receive the signals from the at least one first MFC strain sensor and the at least one second MFC strain sensor sensing device, and measure the at least one fluid flow parameter based on the signals.

In any of the aspects or embodiments described above and herein, the sensing device may include a strap unit configured to clamp the laminate body to the pipe outer radial surface.

In any of the aspects or embodiments described above and herein, the sensing device may include a wrap configured to hold the laminate body to the pipe outer radial surface.

In any of the aspects or embodiments described above and herein, the laminate body may be configured to be attachable to the pipe outer radial surface.

In any of the aspects or embodiments described above and herein, the sensing device may be configured for attachment to the pipe outer radial surface so that the at least one first MFC strain sensor and the at least one second MFC strain sensor are subjected to compressive strain.

In any of the aspects or embodiments described above and herein, each first MFC sensor and each second MFC sensor may have a first sensitivity along a first axis and a second sensitivity along a second axis, which second axis is orthogonal to the first axis, and the second sensitivity is substantially less than the first sensitivity, and the sensing device may be configured for attachment to the pipe outer radial surface so that the at least one first MFC strain sensor and the at least one second MFC strain sensor each have their respective first axis substantially aligned with the circumference of the pipe.

According to an aspect of the present disclosure, an apparatus for measuring one or more parameters of a fluid flow passing within a pipe is provided. The pipe has an outer radial surface and a circumference. The apparatus includes a sensing device and a processing unit. The sensing device includes a sensor array having at least one first macro fiber composite (MFC) strain sensor disposed at a first axial position, and at least one second MFC strain sensor disposed at a second axial position. The first axial position and the second axial position are spaced apart from one another. The at least one first MFC strain sensor and at least one second MFC strain sensor are both configured to produce signals representative of pressure variations of the fluid flow passing within the pipe. The processing unit is configured to receive the signals from the at least one first MFC strain sensor and the at least one second MFC strain sensor sensing device, and measure at least one fluid flow parameter based on the signals.

In any of the aspects or embodiments described above and herein, the sensing device may be configured for attachment to the pipe outer radial surface so that the at least one first MFC strain sensor and the at least one second MFC strain sensor are subjected to compressive strain.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BEST MODE FOR CARRYING OUT THE INVENTION

Figure 1:
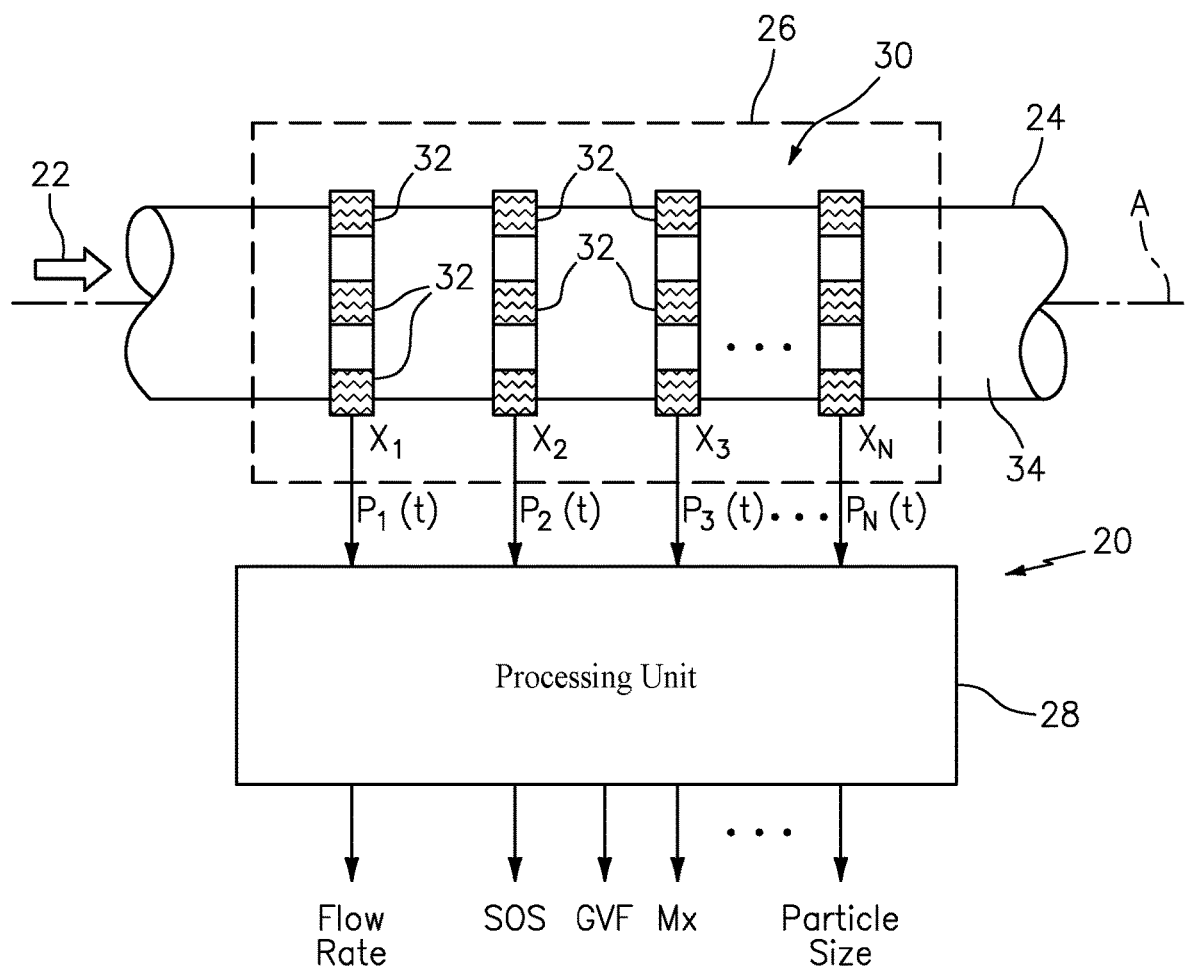
FIG. 1 is a schematic illustration of an apparatus having an array of segmented sensors disposed along a pipe for measuring a parameter of a fluid flowing in the pipe and an associated processing unit, in accordance with the present invention.

Referring to FIG. 1, an apparatus or flow meter, generally shown as 20, is provided to measure the unsteady pressures (P(t)) of a homogeneous or non-homogeneous fluid 22 flowing within a pipe 24 to determine a parameter or characteristic of the fluid. The pipe 24 may be described as extending axially along an axial centerline "A". As will be described hereinafter, the fluid flow 22 traveling through the pipe 24, although typically (but not necessarily) turbulent in nature, may be described as collectively traveling through the pipe 24 in a direction parallel to the axial centerline A of the pipe 24. The flow meter 20 can measure parameters of a single phase fluid (e.g., gas, liquid or liquid/liquid mixture) and/or a multi-phase mixture (e.g., process flow) flowing through a pipe 24. The multi-phase mixture may be a two-phase liquid/gas mixture, a solid/gas mixture or a solid/liquid mixture, gas entrained liquid or a three-phase mixture. As will be described below, at least portions of the flow meter 20 are disposed in communication with an exterior surface of the pipe 24. As used herein, the term "pipe" is used to generically refer to a conduit having an enclosed passage through which a fluid flow may be passed. The present disclosure is not, however, limited to use with a cylindrically-shaped conduit. Some embodiments of the present disclosure flow meter 20, 120, 220, 320 are configured as a "clamp-on" device that facilitates installation thereof, and allow the flow meter 20 to be installed, maintained, serviced and removed without having to interrupt a fluid flow traveling within the interior of the pipe 24.

The flow meter 20 includes a sensing device 26 and a processing unit 28. The sensing device 26 that comprises an array 30 of strain sensors 32 axially spaced along the outer surface 34 of the pipe 24. The aforesaid sensors 32 are configured to sense strain within the pipe wall (which strain is often highly correlated to unsteady pressures within the fluid flow) and provide signals representative thereof. The signals (diagrammatically shown in FIGS. 1, 11, and 14 as "$P_1(t)$-$P_N(t)$") are provided to a processing unit 28, which processes the sensor signals and determines at least one parameter of the fluid flow 22. The aforesaid at least one fluid flow parameter may include, but is not limited to, the volumetric flow rate, process fluid speed of sound, the mass flow rate, the consistency or composition of the fluid flow, the density of the fluid flow, the Mach number of the fluid flow, the size of a particle traveling within the fluid flow, the air/mass ratio of the fluid flow, and/or the percentage of entrained air within a liquid or slurry.

Figure 2:
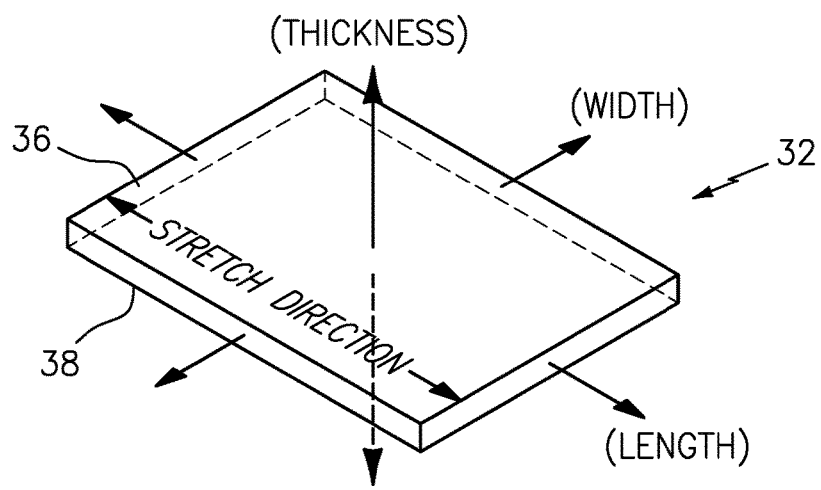
FIG. 2 is a diagrammatic illustration of a MFC strain sensor that may be utilized to sense fluid pressure variations within a pipe.

The sensor array 30 includes at least two sensors 32 in communication with the outer surface 34 of the pipe 24, axially spaced apart from one another. Each of the sensors 32 is a macro fiber composite (MFC) type strain sensor (referred to hereinafter as an "MFC sensor 32"). MFC sensors typically consist of piezofibers (e.g., rectangular piezo ceramic rods) sandwiched between layers of adhesive, electrodes and polyimide film. The electrodes are attached to the film in an interdigitated pattern. The pliable and conformable features of MFC sensors 32 enables them to sense deformations, noise and vibrations. In preferred embodiments of the present disclosure, each MFC sensor 32 is configured to have an anisotropic strain sensitivity; i.e., a strain sensitivity that is greater in a first orthogonal direction, than in a second orthogonal direction. An MFC sensor 32 having an anisotropic strain sensitivity typically has greater strain sensitivity along the axis of its piezofibers as compared to its strain sensitivity in a direction orthogonal to the piezofibers. Referring to FIG. 2, each MFC sensor 32 may be described as having a first face surface 36, a second face surface 38, a length, a width, and a thickness. As described herein, the piezofibers of the MFC sensors 32 extend in the lengthwise direction of the MFC sensor. Hence MFC sensors 32 configured to have an anisotropic strain sensitivity as described herein, have a strain sensitivity along the lengthwise axis of the sensor that is greater than its strain sensitivity along the widthwise axis of the sensor. A pipe containing a fluid flow which may be sensed using the present disclosure apparatus will typically be subjected to a strain field that includes hoop strain (i.e., circumferential) associated with internal pressure variations associated with the fluid flow, as well as axial strain associated with pipe bending vibrations. The hoop strain can be measured to provide beneficial information relating to fluid flow parameters. The axial strain, in contrast, typically represents undesirable noise and detrimentally affects the signal-to-noise ratio of sensors. When mounted on a pipe 24 according to the present disclosure, anisotropic MFC sensors 32 may be mounted to provide a greater strain sensitivity in a pipe 24 circumferential direction; i.e., mounted with the lengthwise axis of the MFC sensor 32 substantially parallel to the circumferential direction. Mounting the anisotropic MFC sensors 32 in this manner positions their "greater sensitivity" axis with potential hoop strain, and their "lesser sensitivity" axis with the undesirable axial pipe bending strain. Hence, the signal-to-noise ratio with the MFC sensors 32 is enhanced. Prior art flow meters often use sensors (e.g., some PVDFs) having orthogonal strain sensitivities that are more isotropic than the anisotropic MFC sensors 32 and therefore have a lower signal-to-noise ratio when used in a similar flow meter application. A non-limiting example of an MFC sensor 32 that may be used in the present disclosure is a sensor model M-8522-P2 produced by the Smart Material GmbH of Germany. It should be noted however, that many different types of MFC sensors can be used with the present disclosure, and the present disclosure is not therefore limited to any particular model MFC sensor.

The number of MFC sensors 32 within the sensor array 30 may vary depending upon the application, and the present disclosure is not therefore limited to any particular number of MFC sensors 32 other than more than two. The number of MFC sensor axial positions (e.g., $X_1$-$X_N$) within the sensor array 30 may also vary depending upon the application (e.g., sensors 32 disposed at as many as sixteen different axial positions), and the present disclosure is not therefore limited to any particular number of axial sensor positions other than at least two.

Figure 3:
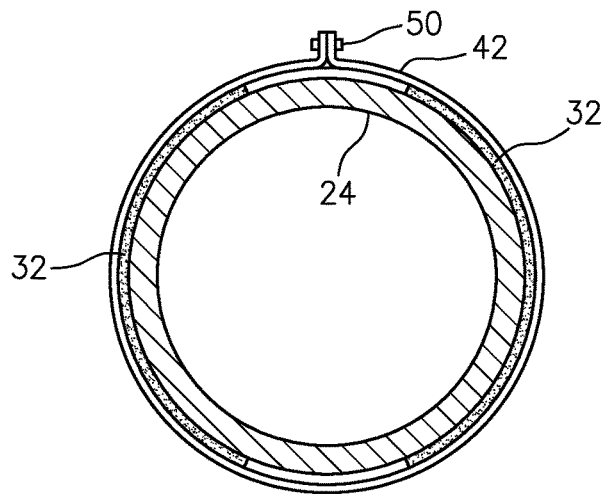
FIGS. 3-5 are side sectional views of a sensor array having a plurality of MFC pressure sensors mounted on a pipe.
Figure 4:
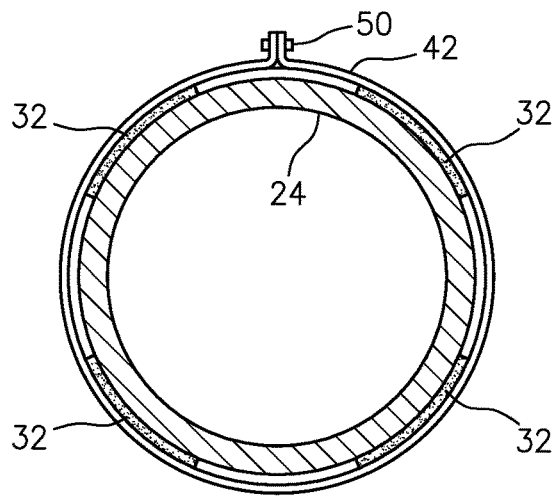
Figure 5:
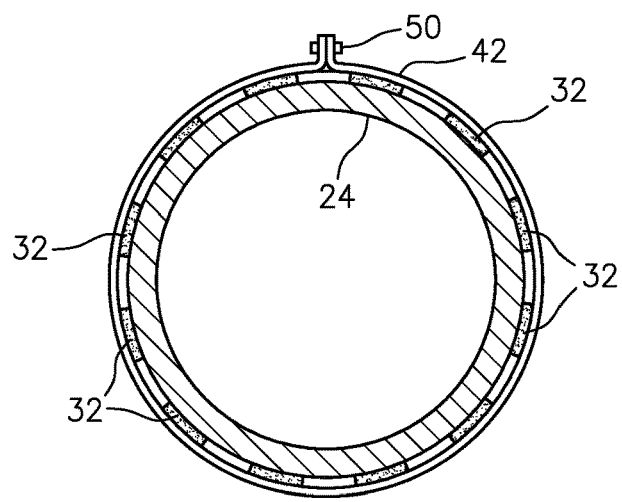

At a given axial position, the sensor array 30 has at least one MFC sensor 32. Typically, however, the sensor array 30 may have a plurality of MFC sensors 32 disposed around the circumference of the pipe 24 (when mounted on the pipe 24) at a given axial position (e.g., $X_1$-$X_N$). For example as shown in FIG. 3, the sensor array 30 includes a pair of MFC sensors 32 at each axial position, each sensor 32 sensing a substantial portion of a respective half of the pipe 24. In FIG. 4, the sensor array 30 includes four (4) MFC sensors 32 at each axial position, each sensor 32 sensing a substantial portion of a respective quarter of the pipe 24. In FIG. 5, the sensor array 30 includes twelve (12) MFC sensors 32 at each axial position, spaced around the pipe 24 circumference. The sensor array 30 may be configured such that the plurality of MFC sensors 32 at a given axial position are uniformly or non-uniformly spaced around the circumference of the pipe 24 when the sensor array 30 is mounted. The sensor array 30 may be configured such that each of the MFC sensors 32 at a given axial position may be the same configuration (e.g., type, dimensions, etc.), or alternatively the sensor array 30 may be configured such that the plurality of MFC sensors 32 at a given axial position may include different configuration MFC sensors 32; e.g., the plurality of sensors 32 including at least one first configuration MFC sensor 32 and at least one second configuration MFC sensor 32.

The circumferentially spaced MFC sensors 32 at a given axial position may be connected in parallel. For example, the leads of one MFC sensor 32 may be directly connected to an adjacent MFC sensor 32. Alternatively, each MFC sensor 32 at an axial position (e.g., $X_1$-$X_N$) may be connected in series, or each MFC sensor 32 at an axial position (e.g., $X_1$-$X_N$) may be directly connected to the processing unit 28. The present disclosure is not limited to these connection embodiments. In those embodiments wherein each MFC sensor 32 is directly connected to the processing unit 28, the processing unit 28 may selectively process signals from the respective MFC sensor 32 independently.

The axial spacing (e.g., $X_1$-$X_N$) between the MFC sensors 32 may vary depending on the application for which the flow meter 20 is designed; e.g., sensing for different types of unsteady pressures may benefit from different sensor axial spacings. For example, characteristics of vortical disturbances 40 within a given fluid flow 22 (and the unsteady pressures they create) may influence a preferred overall axial length of a sensor array 30, and also the inter-sensor axial spacing of MFC sensors 32 within the sensor array 30; e.g., axial sensor 32 spacing that is less than a coherence length of the vortical disturbances 40 which is typically on the order of a pipe diameter. Typically, the inter-sensor spacing ($X_1, X_2, X_3, \ldots X_N$) is uniform (e.g., $X_1=X_2=X_3$, etc.), but uniform inter-sensor spacing is not required. The inter-sensor spacing is also typically known and the distances are typically stored in the processing unit 28 instructions.

We discovered that the performance of MFC sensors 32 can vary significantly depending on the manner in which the sensors 32 are mounted on a surface (e.g., a pipe exterior surface). Specifically, we discovered that the performance of an MFC sensor 32 placed in tension degrades notably (e.g., signal integrity erosion), but the performance of the same type MFC sensor 32 placed in magnitude compression does not appreciably degrade, provided the strain associated with the compression is close to or within strain limits of the MFC sensor 32. The present disclosure leverages this discovery to provide several advantageous sensor 32 mounting arrangements.

Figure 6:
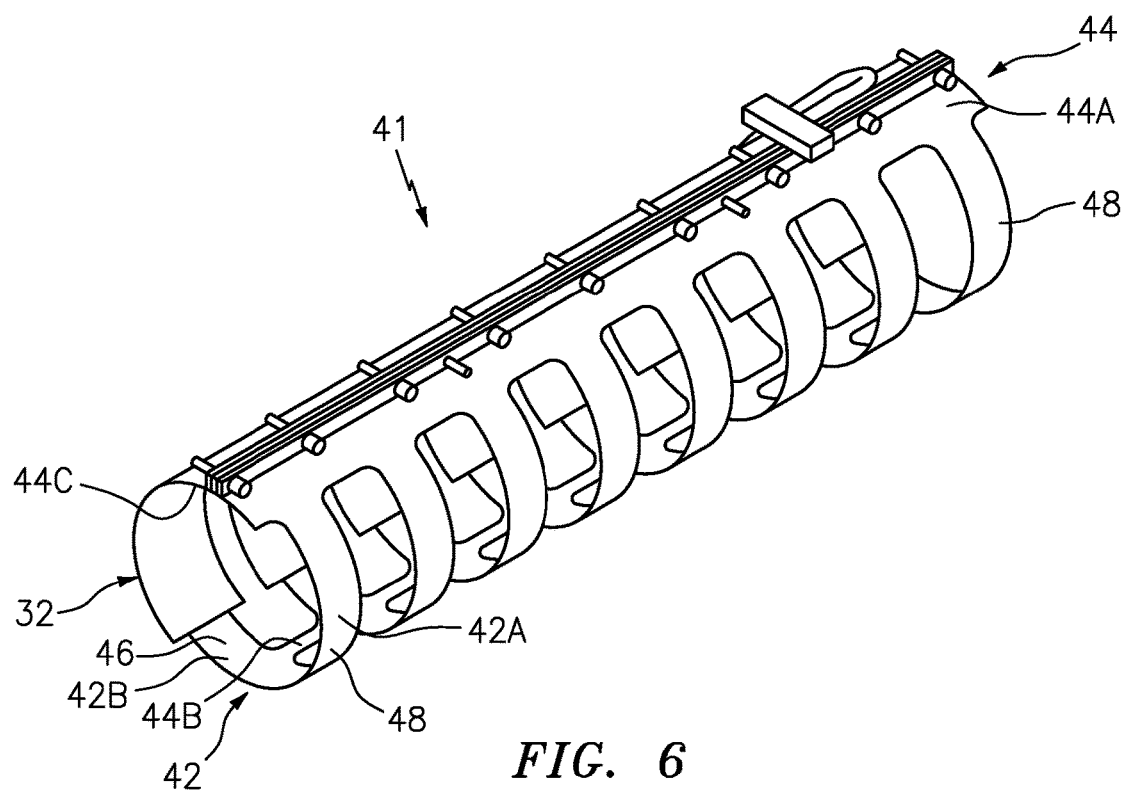
FIG. 6 is a perspective view of a sensor array strap.

In some embodiments, the sensing device 26 includes a strap unit 41 having a plurality of straps 42, and may include one or more spines connecting the straps 42. FIG. 6 illustrates a non-limiting example of a strap unit 41 having a plurality of straps 42, each connected to a first side spine 44A, a central spine 44B, and a second side spine 44C. Each strap 42 may be described as having a first portion 42A extending between the first side spine 44A and the central spine 44B, and a second portion 42B extending between the second side spine 44C and the central spine 44B. Each strap 42 (e.g., first portion 42A, second portion 42B, spines 44) may further be described as having a sensor side surface 46 and an opposed exterior surface 48. The first and second attachment spines 44A, 44C may be configured to be attached to one another via a plurality of fasteners; e.g., bolts 50. When attached to a pipe 24, the strapping configuration is typically mounted such that the straps 42 extend circumferentially around the pipe outer surface 34, and the spines 44A-44C extend axially along the pipe outer surface 34. The present disclosure is not limited to any particular strap unit 41 configuration.

In those embodiments wherein the sensing device 26 includes a strap unit 41, the MFC sensors 32 may be attached to the sensor side surfaces 46 of the straps 42 in the axial and circumferential manner described above. Alternatively, the MFC sensors may be attached to the pipe outer surface 34 (e.g., using an adhesive) in the axial and circumferential manner described above and the strap unit 41 (independent of the MFC sensors 32) then disposed radially outside of the MFC sensors 32. This mounting configuration (sensors 32 between the straps 42 and the pipe outer surface 34) places the MFC sensors 32 in compression, and is in direct contrast to all commercially available flow meters of which we are aware; i.e., configurations in which the straps are disposed between the pipe outer surface 34 and the sensors, and the sensors are loaded in tension.

In those embodiments wherein the sensing device 26 includes a strap unit 41 and the MFC sensors 32 are disposed between the straps 42 and pipe outer surface 34 (i.e., loaded in compression), the strap unit 41 may be configured to clamp the sensors 32 to the pipe outer surface 34. The present disclosure does not require a strap unit 41 that clamp the sensor array 30 to the pipe outer surface 34. Alternatively, the strap unit 41 and MFC sensors 32 may be wrapped around the pipe outer surface 34 and the sensors 32 held in good contact with the pipe outer surface 34 with an adhesive adhering the sensors 32 and strap unit 41 directly to the pipe; e.g., with tape or other material that allows the strap and sensors to be secured to the pipe with some nominal tensile load. A wrap, or similar construct, may provide a means to attach the sensors 32 to the pipe in an axisymmetric manner. The adhesive and or nominal tension loads maintains good contact between the sensor and the pipe, and avoids any undesirable vibrational impact that may be associated with a non-symmetrical clamping arrangement.

Figure 7:
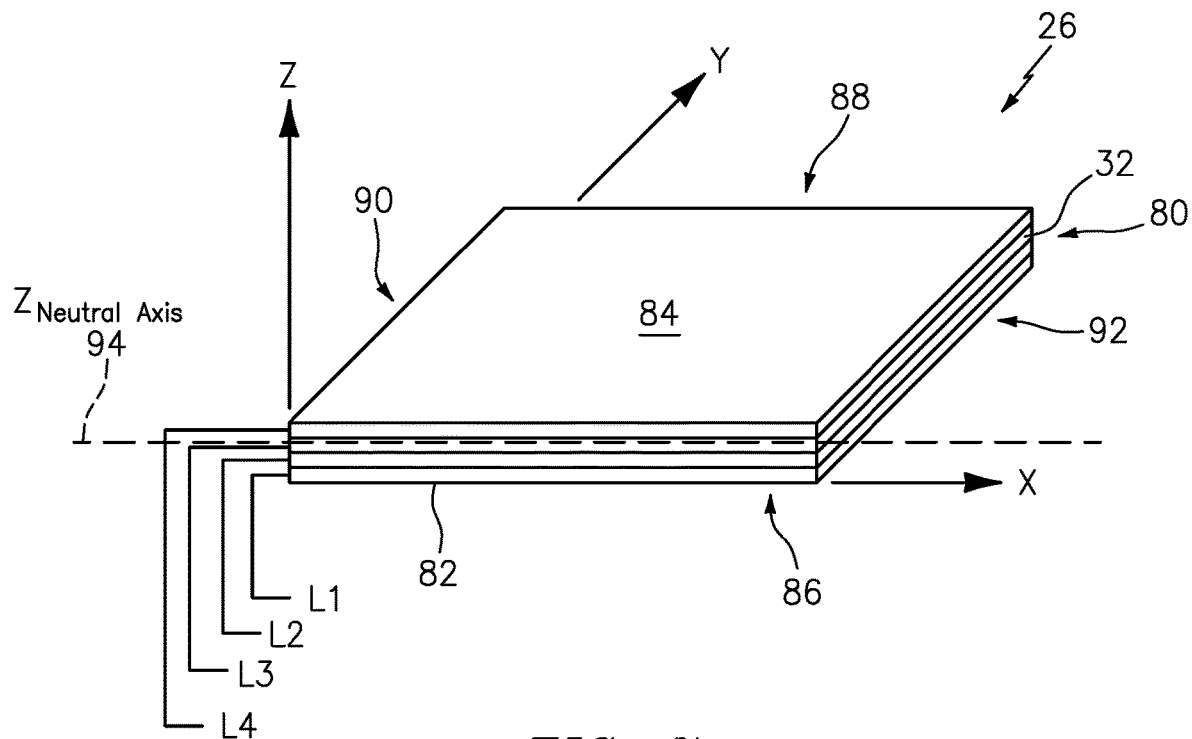
FIG. 7 is a diagrammatic isometric view of a sensing device embodiment.

Referring to FIG. 7, in some embodiments, the sensing device 26 may be configured as a laminate body 80 that includes an array 30 of strain sensors 32 (e.g., see FIGS. 3-5) disposed within a layer of the laminate body 80 with the axial and circumferential spacing as described above. As described herein, a sensing device laminate body 80 may be clamped to a pipe outer surface, or held in place relative to the pipe outer surface by a wrap or similar construct, or may itself be configured for attachment to the pipe outer surface. The laminate body 80 may be described as having a pipe side surface 82 and an opposite outer surface 84, extending axially between a first axial end 86 and a second axial end 88, and laterally between a first circumferential end 90 and a second circumferential end 92. The laminate body 80 comprises a plurality of layers, including a layer that includes the array of MFC sensors 32 (i.e., a "sensor layer"). As indicated above, we discovered that the performance of MFC sensors 32 can vary significantly depending on whether the MFC sensors 32 are placed in tension or in compression. The laminate body 80 configuration provides a mechanism to ensure the MFC sensors 32 are subjected to a predetermined level of compression; e.g., based on: a) the position of the MFC sensors 32 within the stack of layers within the laminate body 80; b) the material properties of each layer within the stack; and c) the bending deformation to which the MFC sensor 32 is subjected (i.e., the radius of curvature that the laminate body 80 will assume when installed on the pipe), including any combination thereof. The layered configuration of the laminate body 80 is advantageous for several reasons. For example, the layered configuration of the laminate body 80 facilitates manufacture; i.e., the laminate body 80 can be readily assembled as a planar body on a planar surface. As another example, the layered configuration of the laminate body 80 can be designed for a specific pipe diameter; e.g., the position of the MFC sensors 32 within the stack of layers within the laminate body 80 and/or the material properties of each layer within the stack can be selected to ensure the MFC sensors 32 are in compression (when the sensing device 26 is installed) for a selected pipe diameter.

The laminate body 80 possesses a neutral axis 94, and the stack of layers and the mechanical properties of those layers define the position of the neutral axis 94. The neutral axis 94 is the plane within the laminate body 80 which experiences no bending stress when the laminate body 80 is deformed in bending. To illustrate, FIG. 7 diagrammatically shows a sensing device 26 configured as a laminate body 80, and also indicates the orientation the sensing device 26 would assume when mounted on a pipe; e.g., Z-axis would be aligned with the radius of the pipe, the Y-axis would be aligned with a lengthwise axis of the pipe, and the X-axis would be aligned with the circumference of the pipe. It should be noted that FIG. 7 diagrammatically illustrates the sensing device laminate body 80 having a rectangular shape to facilitate the description, and the present disclosure is not limited to the rectangular configuration. That said, in some embodiments the laminate body 80 could have an X-axis dimension equal to the circumference of the pipe to which it is to be applied (i.e., $2\pi r$) and a Y-axis dimension that is a function of the number of axial positions of the MFC sensors 32 within the array. The location of the neutral axis 94 within the laminate body 80 may be determined using the following equation:

$$Z_{Neutral\ Axis} = \frac{\sum_{i=1}^{N} E_i t_i Z_i}{\sum_{i=1}^{N} E_i t_i}$$

where $Z_i$ is the Z-axis location of the center of the respective layer, $t_i$ is the thickness of the respective layer, and $E_i$ is Elastic Modulus of the respective layer. Note that Z=0 at a defined exposed surface of the laminate body 80; e.g., the pipe side surface 82 of the laminate body 80. Hence, the position of the neutral axis 94 ($Z_{NeutralAxis}$) is determined by the ratio of the sum of the products of the Elastic Modulus, thickness and location of the respective layers, and the sum of the products of the Elastic Modulus and thickness of the respective layers.

Figure 8:
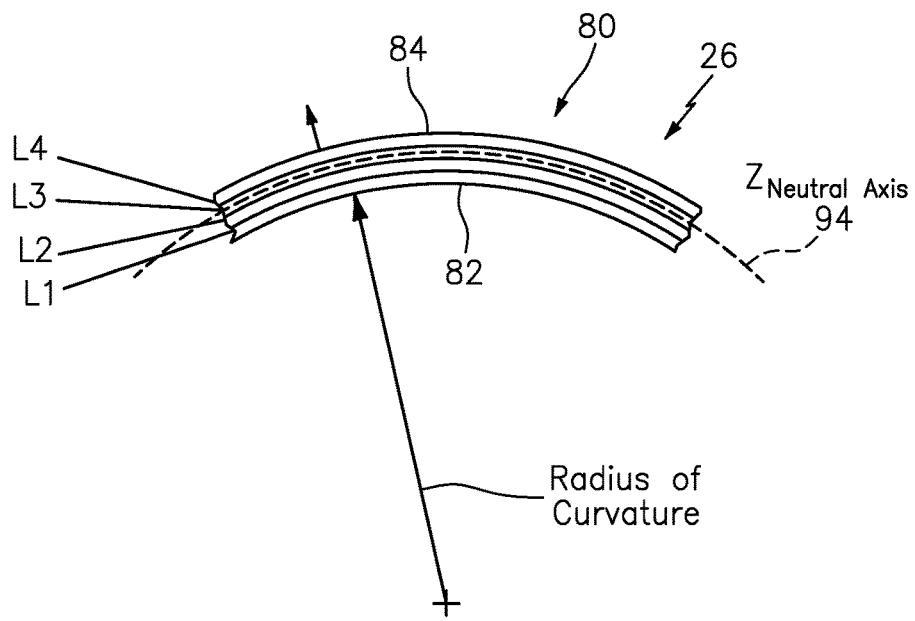
FIG. 8 is a diagrammatic end view of a sensing device embodiment in bending deformation.

Referring to FIGS. 7 and 8 when the laminate body 80 deformed by bending (e.g., applied to the outer surface of a pipe), the amount of strain that develops in each respective layer is proportional to the ratio of the distance between the respective layer and the neutral axis 94 of the laminate body 80, divided by the radius of curvature of the bending deformation (i.e., the pipe radius), and may be determined using the following equation:

$$\varepsilon_i = \frac{Z_i - Z_{NeutralAxis}}{R_{curvature}}$$

In this or similar manner, a laminate body 80 can be configured to ensure the MFC sensors 32 are in compression for a given application (e.g., pipe diameter). The laminate body 80 is also typically configured to ensure the MFC sensors 32 are not subjected to strain attributable to bending deformation that substantially exceeds the manufacturer's designated maximum strain limit for the given application; i.e., for the amount of bending deformation for a given pipe diameter.

To illustrate further, consider the four layer laminate body 80 shown in FIG. 7, and as a non-limiting example assume that the four layer laminate body 80 comprises a stack having a bottom layer L1 (i.e., the layer that would be contiguous with the pipe outer surface when mounted) of Kapton® having a thickness of three thousandths of an inch (i.e., 0.003 inch, or "3 mils"), a next layer L2 that includes the MFC sensors 32 having a thickness of six thousandths of an inch (i.e., 0.006 inch, or "6 mils"), a next layer L3 of Kapton® having a thickness of three thousandths of an inch (i.e., 0.003 inch, or "3 mils"), and a top layer L4 of steel having a thickness of three thousandths of an inch (i.e., 0.003 inch, or "3 mils"). Kapton® is a flexible polyimide film product produced by the E.I. DuPont de Nemours and Company Corporation of Wilmington, Del., USA. The present disclosure is not limited to the aforesaid exemplary laminate body 80 layer materials, which are provided only for illustrative purposes. Using published values for the Elastic Modulus of each respective layer material, the bending strain for each layer can be determined as a function of the radius of curvature. Assuming a radius of curvature (two inches) associated with a four inch diameter pipe, the bending strains are as follows:

TABLE 1

| Layer Number | Layer Material | Layer Thickness | Layer Elastic Modulus | Average Strain within Layer |
|---|---|---|---|---|
| L4 | Steel | 0.003 inch | 3.00E+07 | +0.09% |
| L3 | Kapton ® | 0.003 inch | 3.63E+05 | −0.06% |
| L2 | MFC Sensor | 0.006 inch | 4.40E+06 | −0.28% |
| L1 | Kapton ® | 0.003 inch | 3.63E+05 | −0.51% |

In this exemplary laminate body 80 stack, the neutral axis ($Z_{NeutralAxis}$) is located at eleven and seven tenths thousandths of an inch (0.00117 inch, or 11.7 mils) from the outer surface of layer L1. Compressive strain is a negative value, and tensile strain is a positive value. As seen from the strain values in Table 1, the four layer laminate body 80 stack having MFC sensors 32 disposed between the outer steel layer and the outer pipe diameter are subject to compressive strain when applied to a four inch diameter pipe—compressive strain that does not appreciably negatively affect the performance of the MFC sensors 32. It should be noted that the strains determined for the given bending deformation are steady state strains, as compared to the unsteady strain field generated by unsteady pressure fluctuations associated with fluid flow passing through a pipe that the sensing device 26 is used to sense.

To illustrate still further, consider a variant of the four layer sensing device laminate body shown in FIG. 7, wherein the laminate body 80 includes the same layers (e.g., same material, same thickness) but arranged such that the bottom layer L1 is steel, the next layer L2 is Kapton®, the next layer L3 includes the MFC sensors 32, and the top layer L4 is Kapton®. Again, assuming a radius of curvature (two inches) associated with a four inch diameter pipe, the bending strains are as follows:

TABLE 2

| Layer Number | Layer Material | Layer Thickness | Layer Elastic Modulus | Average Strain within Layer |
|---|---|---|---|---|
| L4 | Kapton ® | 0.003 inch | 3.63E+05 | +0.51% |
| L3 | MFC Sensor | 0.006 inch | 4.40E+06 | +0.28% |
| L2 | Kapton ® | 0.003 inch | 3.63E+05 | +0.06% |
| L1 | Steel | 0.003 inch | 3.00E+07 | −0.09% |

In this exemplary laminate body stack, the neutral axis ($Z_{NeutralAxis}$) is located at three and three tenths thousandths of an inch (0.0033 inch, or 3.3 mils) from the outer surface of layer L1. As seen from the strain values in Table 2, in this comparative example wherein the MFC sensors 32 are disposed radially outside of the steel layer within the laminate stack (and the steel layer is disposed contiguous with the pipe outer surface, the MFC sensors 32 are subject to tensile strain when applied to a four inch diameter pipe—tensile strain that does appreciably negatively affect the performance of the MFC sensors 32. From these two comparative examples, it is clear that a laminate body 80 embodiment that includes MFC sensors 32 disposed on the pipe side of the neutral axis 94 of the laminate body 80 (i.e., in compression) provides enhanced performance.

As stated above, the present disclosure is not limited to the sensing device laminate body 80 layer examples provided above. In some embodiments, for example, a sensing device laminate body 80 may be configured to facilitate the sensing device 26 being used as a clamp-on device. A laminate body 80 stack configuration that includes an inner most layer that is releasable from a pipe surface, and configured to protect the MFC sensors 32 (during installation, use, and/or removal of the sensing device), and that has the MFC sensors 32 disposed on the pipe side of the neutral axis 94 of the laminate body 80 (i.e., in compression) would be a significant improvement over prior art sensing devices. An inner most layer that is configured to protect the MFC sensors 32 has sufficient mechanical properties to prevent damage to the MFC sensors 32 (i.e., a sensing device in undamaged form) and thereby permits the sensing device 26 to be reused (i.e., applied to different pipe sensing sites), preferably reused a plurality of times. An inner most layer that is releasable from the pipe outer surface 34 may be configured so that the sensing device can be used a plurality of times (reusable); e.g., the sensing device 26 released from the pipe outer surface (e.g., adhesive removed from the inner most layer via a solvent, or an adhesive on the inner most layer that permits disengagement) with no damage, or inconsequential damage. A non-limiting example of such a laminate body 80 includes an inner most layer comprising a layer that may be removably adhered to the pipe outer surface (e.g., a metallic or polymeric material), and includes a remaining layer stack up that has the MFC sensors 32 disposed on the pipe side of the neutral axis 94 of the laminate body 80 (i.e., in compression); e.g., an inner most metallic layer having a first thickness, and an outer metallic layer having a second thickness greater than the first thickness which results in MFC sensors 32 disposed on the pipe side of the neutral axis 94 of the laminate body 80 (i.e., in compression). Such embodiments can have a circumferentially symmetric configuration that avoids asymmetric effects, and may also obviate the need for a clamping mechanism, thereby further avoiding asymmetric effects. In addition, the present disclosure is not limited to a singular sensing device laminate body 80. In some alternative embodiments, the sensing device laminate body 80 described above as including an array 30 of strain sensors 32 may be configured as a plurality of independent laminate bodies, each having fewer than all of the strain sensors within the array. For example, in a sensing device 26 embodiment having one or more strain sensors disposed at "N" different axial positions (where "N" is an integer), the laminate body 80 may include "N" independent laminate body portions, each including the one or more strain sensors at the respective axial position. Alternatively, in a sensing device 26 embodiment having one or more strain sensors disposed at "N" different axial positions, the laminate body 80 may include a plurality of independent laminate body portions, each including the one or more strain sensors at a plurality of axial positions (but less than all of the axial positions), and the like. In still further alternative embodiments, a sensing device 26 embodiment having one or more strain sensors disposed at "N" different axial positions may include an independent laminate body portion for each strain sensor in the array.

In a still further alternative mounting arrangement, the MFC sensors 32 may be attached to the pipe outer surface 34 individually in the axial and circumferential manner described above without a strap unit 41. In some embodiments, a wrap, or similar construct, may be disposed radially outside of the MFC sensors 32 attached to the pipe outer surface 34.

A shortcoming of all SONAR clamp-on flow meters of which we are aware (e.g., flow meters using PVDF type sensors) is that these devices cannot effectively measure liquid fluid flows at a flow velocity below three feet per second (3 f/s) or gas fluid flows at or below about fifteen feet per second (15 f/s). At fluid flow velocities below 3 f/s, prior art flow meters or which we are aware lack the sensitivity necessary to generate a signal level adequate for array processing and consequently flow velocity determination is problematic. The present disclosure flow meters having MFC sensors 32 mounted in compression provide a substantially improved sensitivity that permits flow velocity measurements below three feet per second (3 f/s) or gas fluid flows at or below about fifteen feet per second (15 f/s).

Figure 9:
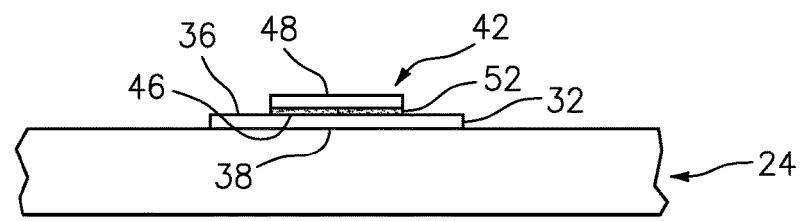
FIG. 9 is a diagrammatic view of an MFC sensor and strap mounted on a pipe wall.

FIG. 9 illustrates a diagrammatic sectional view an MFC sensor 32 mounted on a pipe wall. The first face surface 36 of the MFC sensor 32 is attached to the sensor side surface 46 of the strap 42; e.g., via an adhesive 52 disposed between the first face surface 36 of the MFC sensor 32 and the strap 42. The MFC sensor 32 is attached to the strap 42 so the length of the sensor 32 is parallel to the circumferentially extending portion of the strap 42. In other words, when the sensor array 30 is mounted on a pipe outer surface 34, the length of the MFC sensor 32 is extending in a pipe 24 circumferential direction.

Referring to FIGS. 1, 11, 13, and 14, the processing unit 28, 128, 228, 328 may include any type of computer, computing device, computational circuit, or any type of processing circuit capable of executing a series of instructions that are stored in a memory device. For example, the processing unit 28, 128, 228, 328 may include one or more processors and/or multicore CPUs (collectively referred to hereinafter as a "processor" to facilitate the description). The processor may be a microprocessor, a digital signal processor, a co-processor, a micro-controller, a microcomputer, a central processing unit, a field programmable gate array, a programmable logic device, a state machine, logic circuitry, analog circuitry, digital circuitry, etc., and any combination thereof. The instructions stored in the memory device may represent logic instructions (e.g., commands), one or more algorithms, etc., for operating at least a portion of the flow meter, communicating to and from the flow meter, etc. The stored instructions are not limited to any particular form (e.g., program files, system data, buffers, drivers, utilities, system programs, etc.) provided they can be executed by the processor. The memory device may be a non-transitory computer readable storage medium configured to store instructions that when executed by the processor, cause the processor to perform or cause the performance of certain functions or commands. The memory device may be a single memory device or a plurality of memory devices. The memory device may include read-only memory, random access memory, volatile memory, non-volatile memory, static memory, dynamic memory, flash memory, cache memory, and/or any device that stores digital information.

As described herein, the processing unit 28, 128, 228, 328 is configured to communicate with the sensor array 30, and therefore includes whatever stored instructions are required to perform such communication. In some embodiments, the flow meter 20, 120, 220, 320 may include one or more displays (not shown) configured to display data (e.g., data based on the sensed fluid flow 22), one or more data communication ports (input and/or output—not shown), and communication structure that permits communication to and/or from the flow meter 20, 120, 220, 320; e.g., wireless communication capability that permits a remote operator to communicate with, or receive communications from, the flow meter 20, 120, 220, 320. The aforesaid communications may include data transfer and operating instructions.

The present disclosure sensor array 30 is not limited to being used with any particular algorithmic approach for processing the signals produced by the sensor array 30. In other words, the present disclosure sensor array 30 may be used with processing units 28, 128, 228, 328 that process the sensor array signals in a variety ways to determine the desired fluid flow parameters; e.g., fluid flow velocity, volumetric fluid flow rate, mass flow rate, etc.

In some embodiments, the present disclosure flow meter 20, 120, 220, 320 has the ability to determine fluid flow parameters such as fluid flow velocity, volumetric flow rate, mass flow rate, and others using one or both of the following techniques described herein below: 1) determining the velocity of unsteady pressure variations by sensing vortical disturbances (and/or other inhomogeneities) traveling with the fluid flow 22 using the sensor array 30; and/or 2) determining the speed of sound of acoustical disturbances or sound waves propagating through the fluid flow 22 using the sensor array 30.

Generally, the first technique measures the velocities associated with unsteady flow fields and/or pressure disturbances (e.g., the vortical disturbances 40). The MFC pressure sensors 32 sense the unsteady pressures created by the vortical disturbances 40 as these disturbances convect within the fluid flow in a known manner with reference to the fluid flow 22 in the pipe 24. Therefore, the velocity of these vortical disturbances is related to the velocity of the fluid flow 22 and hence the volumetric flow rate may be determined, as will be described in greater detail hereinafter. The second technique senses unsteady pressures created by acoustical disturbances propagating through the fluid to determine the speed of sound (SOS) of the acoustical disturbances. Knowing the pressure and/or temperature of the fluid and the speed of sound of the acoustical disturbances, the processing unit can determine parameters such as the mass flow rate (using a determined volumetric flow rate), the consistency of the fluid (i.e., the mass/air ratio, the mass/liquid ratio, the liquid/air ratio), the density of the fluid, the enthalpy of the fluid, and the Mach number of the fluid, and the size of particles with the fluid, and the like.

In regards to vortical disturbances 40, the present disclosure flow meter 20 may determine the volumetric flow rate by sensing vortical disturbances 40 (sometimes referred to as "eddies"; see FIG. 10) propagating with the fluid flow 22 using the sensor array 30. Coherent structures such as vortical disturbances 40 are an inherent feature of turbulent boundary layers present in all turbulent flows. The MFC sensors 32 sense the fluid flow pressure variations $P_1(t)$-$P_N(t)$ at each axial location of the sensor array 30 and produce signals representative thereof. Therefore, the velocity of the vortical disturbances 40 as they pass through the portion of the pipe 24 in communication with the sensor array 30 is related to the velocity of the fluid flow 22 and hence the volumetric flow rate may be determined, as will be described in greater detail hereinafter. The volumetric flow may be determined by multiplying the velocity of the fluid flow by the cross-sectional area of the pipe 24.

Figure 10:
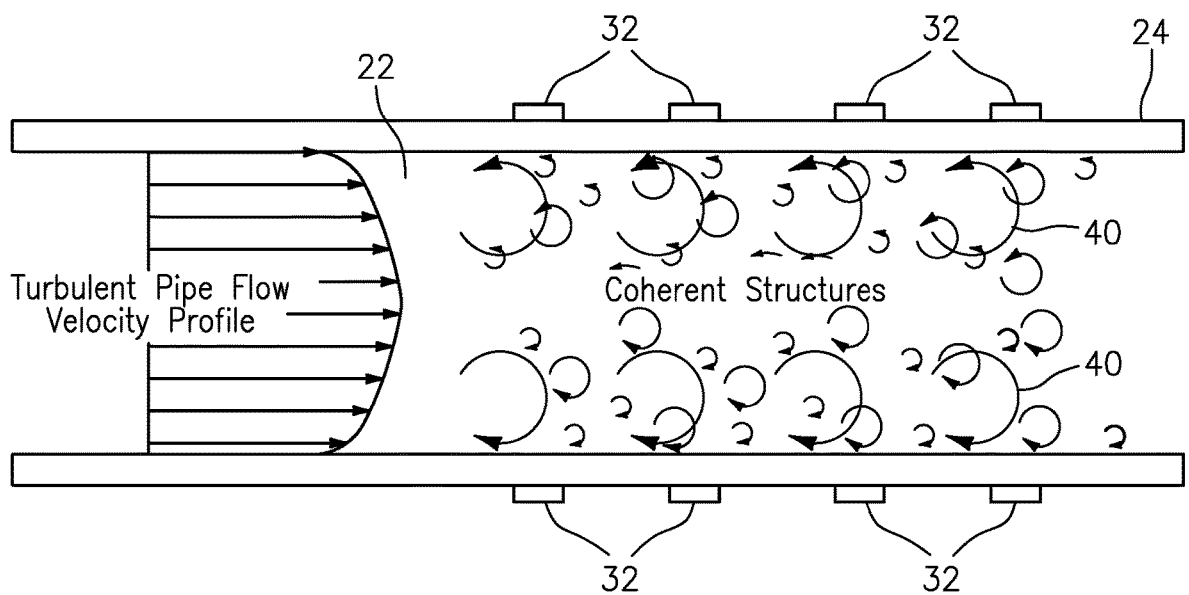
FIG. 10 is a cross-sectional view of a pipe having a turbulent pipe flowing having coherent structures therein.

FIG. 10 illustrates the relevant flow features of turbulent fluid flow 22 within a pipe 24 along with an axial sensor array 30 of at least two pressure sensors 32. As shown, the time-averaged axial velocity is a function of radial position, from zero at the pipe wall to a maximum at the centerline of the pipe 24. The flow 22 near the pipe wall is characterized by steep velocity gradients and transitions to relatively uniform core flow near the center of the pipe 24. Vortical disturbances 40 are superimposed over the time averaged velocity profile. These vortical disturbances 40 (i.e., coherent structures) contain temporally and spatially random fluctuations with magnitudes typically less than 10% percent of the mean fluid flow velocity and are carried along with the mean fluid flow. Experimental investigations have established that vortical disturbances 40 generated within turbulent boundary layers remain coherent for several pipe diameters and convect at roughly 80% of maximum fluid flow velocity (Boundary-layer Theory, Schlichting, H., McGraw-Hill 1979).

The Reynolds number (Re), based on pipe diameter (D), characterizes many of the engineering properties of the fluid flow 22. The Reynolds number is a non-dimensional ratio representing the relative importance of inertial forces to viscous forces within a flow:

$$Re = \frac{\text{Inertial dynamic head}}{\text{Viscous shear stress}} \approx \frac{\rho u^2}{\mu \frac{\partial u}{\partial y}} \approx \frac{\rho u}{\mu U} = \frac{UD}{v}$$

Where "$\rho$" is the fluid density, "$\mu$" is the dynamic viscosity, "U" is the volumetrically averaged flow velocity, $v$ is the kinematic viscosity, and D is the pipe diameter.

The critical Reynolds number for pipe flows, above which fluid flows are considered turbulent, is ~2300. In addition to demarcating a boundary between laminar and turbulent flow regimes, the Reynolds number is a similarity parameter for pipe flows, i.e. fluid flows in geometrically dissimilar pipes with the same Reynolds number are dynamically similar (Schlichting, p.12).

Figure 11:
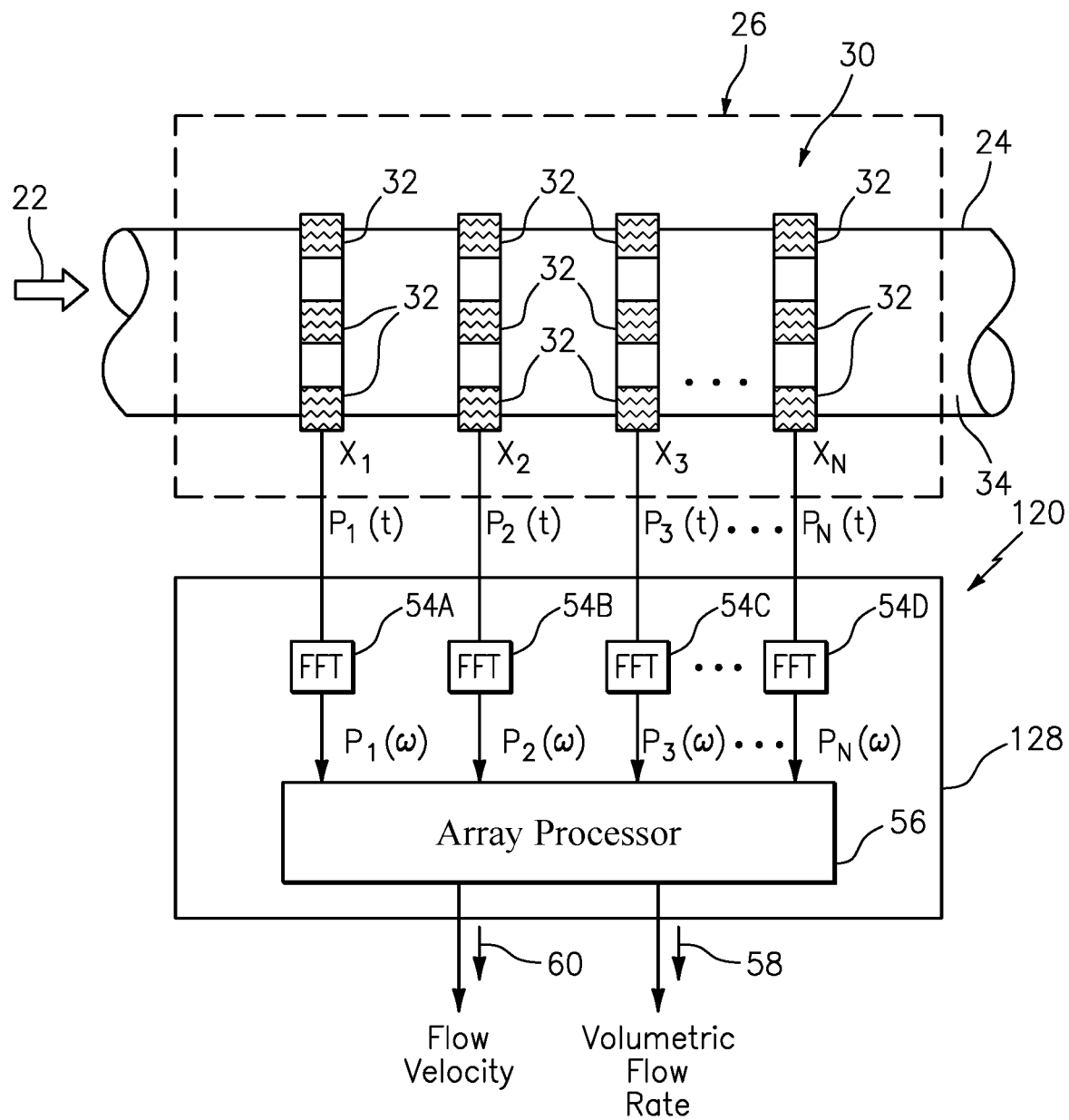
FIG. 11 is a schematic illustration of a flow meter embodiment.

As shown in FIG. 11, a present disclosure flow meter 120 embodiment has an array of MFC pressure sensors 32, located at locations $X_1$, $X_2$, $X_3$, . . . $X_N$, respectively. The MFC pressure sensors produce transit time-varying signals $P_1(t)$, $P_2(t)$, $P_3(t)$, . . . $P_N(t)$ to Fast Fourier Transform (FFT) logics 54A-54D within processing unit 128, respectively. The FFT logics 54A-54D calculate the Fourier transform of the time-based input signals $P_1(t)$-$P_N(t)$ and provide complex frequency domain (or frequency based) signals $P_1(\omega)$, $P_2(\omega)$, $P_3(\omega)$, . . . $P_N(\omega)$ indicative of the frequency content of the input signals. Instead of FFT's, any other technique for obtaining the frequency domain characteristics of the signals $P_1(t)$-$P_N(t)$, may be used.

The frequency signals $P1(\omega)$-$P_N(\omega)$ are fed to an array processor 56, which provides a flow signal 58 indicative of the volumetric flow rate of the fluid flow 22 and a velocity signal 60 indicative of the velocity of the fluid flow 22.

One technique of determining the convection velocity of the vortical disturbances 40 within the fluid flow 22 is by characterizing the convective ridge of the vortical disturbances 40 using a sensor array 30 and beam forming techniques, similar to that described in U.S. Pat. No. 6,609,069, entitled "Method and Apparatus for Determining the Flow Velocity Within a Pipe", which is incorporated herein by reference. This technique of determining the convection velocity of the vortical disturbances 40 will be described in greater detail hereinafter. The flow metering methodology uses the convection velocity of vortical disturbances 40 with turbulent pipe flows 22 to determine the volumetric flow rate. The convection velocity of these vortical disturbances 40 is determined by applying arraying processing techniques to determine the speed at which the disturbances 40 convect past the sensor array 30, similar to that used in the RADAR and SONAR fields.

The array processing algorithms determine the speed of the disturbances 40 by characterizing both the temporal and spatially frequency characteristics of the flow field. For a series of coherent disturbances convecting past a fixed array 30 of MFC pressure sensors 32, the temporal and spatial frequency content of pressure fluctuations are related through the following relationship:

$$k = \frac{\omega}{U_{convect}}$$

Here "k" is the wave number or spatial frequency, defined as k=2Π/λ and has units of 1/length, "ω" is the temporal frequency in rad/sec, and $U_{convect}$ is the convection velocity. Thus, the temporal frequency, ω, is linearly related to the spatial frequency, k, by the convection velocity.

In array processing, the spatial/temporal frequency content of time stationary sound fields are often displayed using "k-ω plots". K-ω plots are essentially three-dimensional power spectra in which the power of the acoustic field is decomposed into bins corresponding to specific spatial wave numbers and temporal frequencies. On a k-ω plot, the power associated with a pressure field convecting with the fluid flow is distributed in regions, which satisfies the dispersion relationship developed above. This region is termed "the convective ridge" (*Noise and Vibration Control Engineering*, Beranek, L., Wiley 1992) and the slope of this ridge on a k-ω plot indicates the convective velocity of the pressure field determine by measuring the variation in the pressure by each pressure sensor 32. This suggests that the convective velocity of vortical disturbances 40 (e.g., "eddies"), and hence fluid flow rate within a pipe 24, can be determined by constructing a k-ω plot from the output of a sensor array 30 and identifying the slope of the convective ridge, as will be described in greater detail hereinafter.

As described hereinbefore, embodiments of the present disclosure flow meter 20, 120, 220, 320 may be based on the observation that vortical disturbances 40 within a fluid flow 22 produce coherent pressure anomalies which can be sensed by the MFC sensors 32 and that the vortical disturbances 40 move at either the same velocity as the moving fluid, or at a velocity that can be correlated to the velocity of the moving fluid. The array processing can be performed by exploiting what is sometimes called the dispersion relationship associated with convective disturbances (i.e. ω=uk, where "ω" is the angular frequency of the signal of the vortical disturbance, "u" is the velocity of the disturbance, and "k" is the wavenumber of the signal). Convective disturbances (e.g., vortical disturbances 40) in a fluid flow 22 can be viewed as disturbances that are fixed to the fluid. These disturbances have a spatial variation associated with them. Since the disturbance can be viewed as affixed to the fluid particles, the spatial variations result in temporal variations when sensed by stationary sensors. The spatial wavelength of the disturbances that move with the fluid is thereby linked to the temporal variations observed by the stationary sensors. The present invention relies on utilizing array processing techniques to identify this relationship and thereby determine the convection velocity of the fluid.

The data $P_1(\omega)$-$P_N(\omega)$ accumulated over a sampling interval is provided to the array processor 56, which performs a spatial-temporal (two-dimensional) transform of the sensor data, from an x-t domain to the k-ω domain, and then calculates the power in the k-ω plane, as represented by k-ω plot.

To calculate the power in the k-ω plane, as represented by a k-ω plot (see FIG. 12) of either the pressure signals or the differenced pressure signals, the array processor 56 determines the wavelength and so the (spatial) wavenumber k, and also the (temporal) frequency and so the angular frequency ω, of various of the spectral components created by the vortical disturbances. There are numerous algorithms available in the public domain to perform the spatial/temporal decomposition of sensor array 30 signals.

Figure 12:
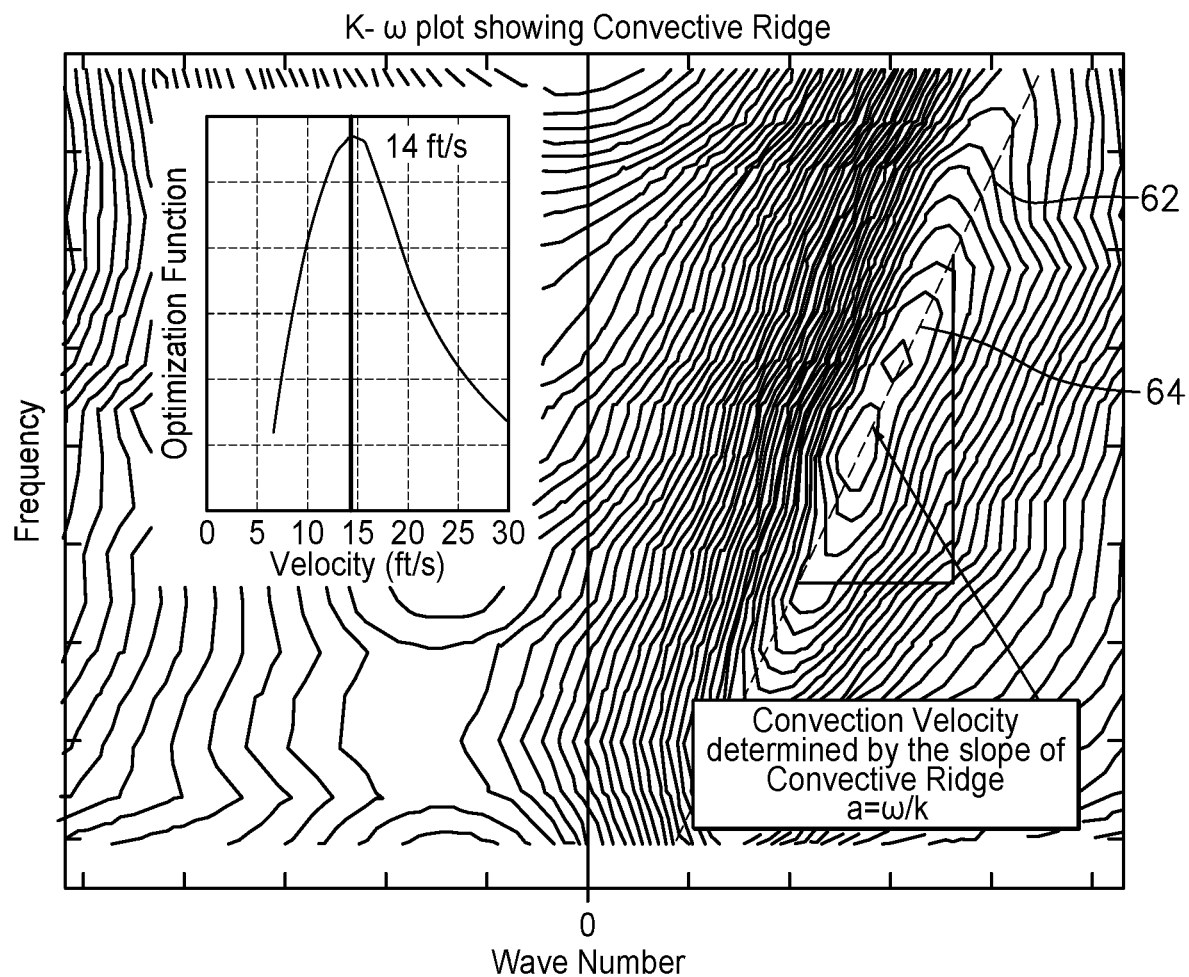
FIG. 12 a k-ω plot of data that illustrates slope of a convective ridge, and a plot of the optimization function of the convective ridge.

In the case of suitable vortical disturbances 40 being present, the power in the k-ω plane shown in a k-ω plot of FIG. 12 so determined will exhibit a structure that is called a convective ridge 62. The convective ridge 62 represents the concentration of the vortical disturbances 40 that convect with the fluid flow 22 and is a mathematical manifestation of the relationship between the spatial variations and temporal variations described above. Such a plot will indicate a tendency for k-ω pairs to appear more or less along a line 64 with some slope, the slope indicating the flow velocity, as is described in more detail below. The power in the k-ω plane so determined is then provided to a convective ridge identifier which uses one or another feature extraction method to determine the location and orientation (slope) of any convective ridge 62 present in the k-ω plane. Finally, information including the convective ridge 62 orientation (slope) is used to determine the flow velocity.

The array processor 56 may use standard so-called beam forming, array processing, or adaptive array-processing algorithms; i.e. algorithms for processing the sensor 32 signals using various delays and weighting to create suitable phase relationships between the signals provided by the different sensors 32, thereby creating phased antenna array functionality. In other words, the beam forming or array processing algorithms transform the time domain signals from the sensor array 30 into their spatial and temporal frequency components; i.e. into a set of wave numbers given by k=2Π/λ, where λ is the wavelength of a spectral component, and corresponding angular frequencies given by ω=2Πυ.

The prior art teaches many algorithms of use in spatially and temporally decomposing a signal from a phased array of sensors, and the present invention is not restricted to any particular algorithm. One particular adaptive array processing algorithm is the Capon method/algorithm. The Capon method is a non-limiting example of an acceptable array processing algorithm. Other adaptive array processing algorithms (e.g., the MUSIC algorithm) may be used alternatively.

Figure 13:
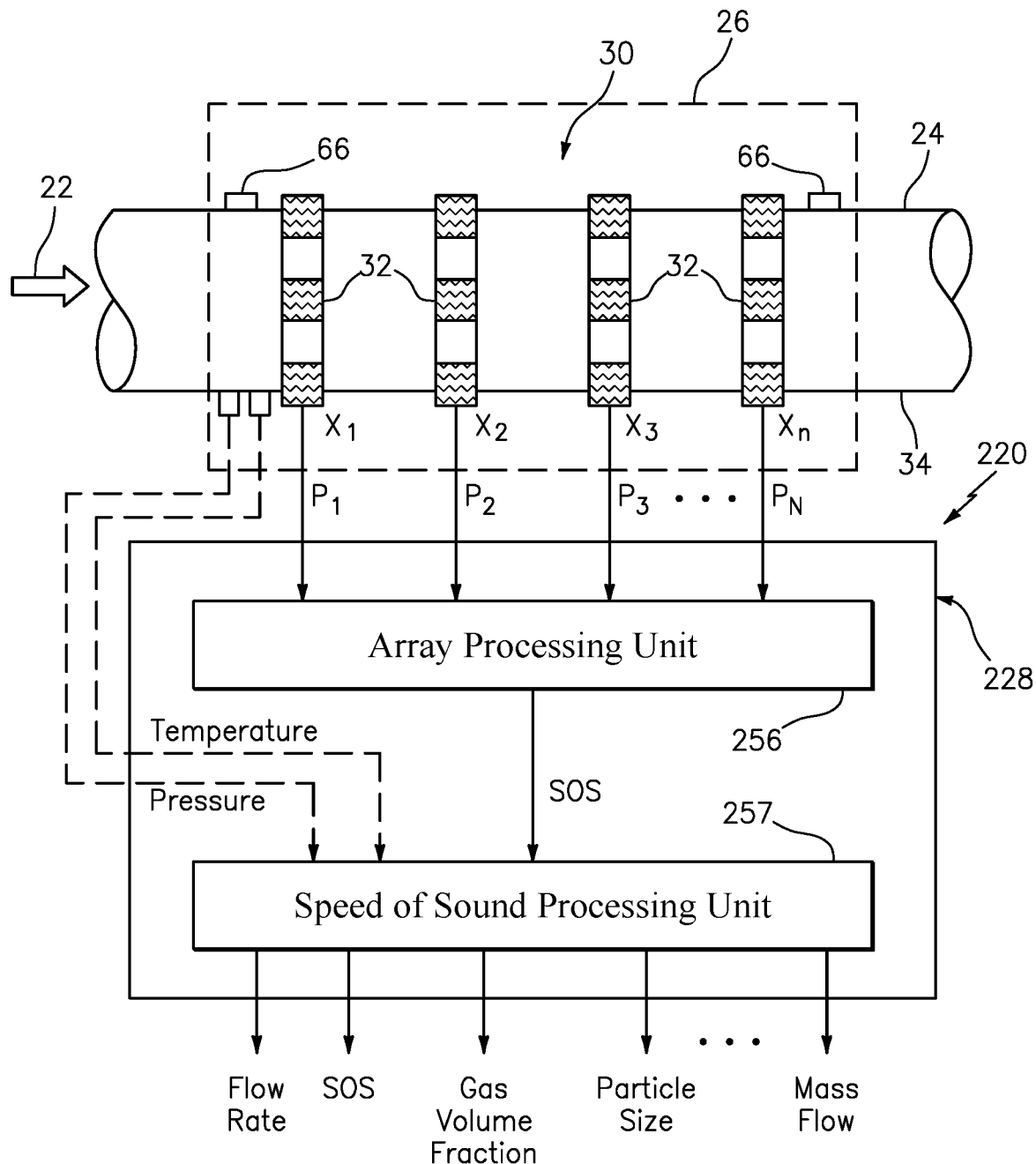
FIG. 13 is a schematic illustration of a flow meter embodiment.

FIG. 13 illustrates a schematic drawing of an embodiment of the present disclosure wherein the processing unit 228 is configured to determine the speed of sound of acoustical disturbances or sound waves propagating through the fluid using the sensor array 30. The MFC sensors 32 within the sensor array 30 sense for strain/unsteady pressures produced by acoustical disturbances present within the fluid flow 22 passing through the pipe 24. The unsteady pressures are indicative of the SOS propagating through the fluid. The MFC sensors 32 produce signals ($P_1$-$P_N$) representative of the fluid flow pressure variations and those signals are provided to the processing unit 228. The processing unit 228, in turn, processes the signals (e.g., using array processing unit 256 and Speed of Sound processing unit 257) to determine a fluid flow parameter such as the speed of sound (SOS) within the fluid flow. Knowing the pressure and/or temperature of the fluid flow 22 and the speed of sound of the acoustical disturbances, the processing unit 228 can also determine other fluid flow parameters such as the gas volume fraction (GVF) of the fluid flow; e.g., in a manner similar to that described in U.S. Pat. Nos. 7,359,803; 7,062,976; 7,058,549; 7,032,432; 6,732,575; 6,609,069; 6,587,798; and 6,354,147, each of which is incorporated herein by reference in its entirety.

The acoustical disturbances sensed by the sensor array 30 may be "naturally" produced within the environment of the pipe 24 (e.g., passive noise generated by pumps, valves, motors, the turbulent mixture itself, etc.). The present disclosure also contemplates providing one or more acoustic sources 66 to enable the measurement of the speed of sound propagating through the fluid flow 22 for instances of acoustically quiet flow. The acoustic sources 66 may be disposed at the input end or output end of the sensor array 30, or at both ends as shown. One should appreciate that in most instances the acoustics sources 66 are not necessary and the apparatus passively detects the acoustic ridge provided in the flow 22.

Figure 14:
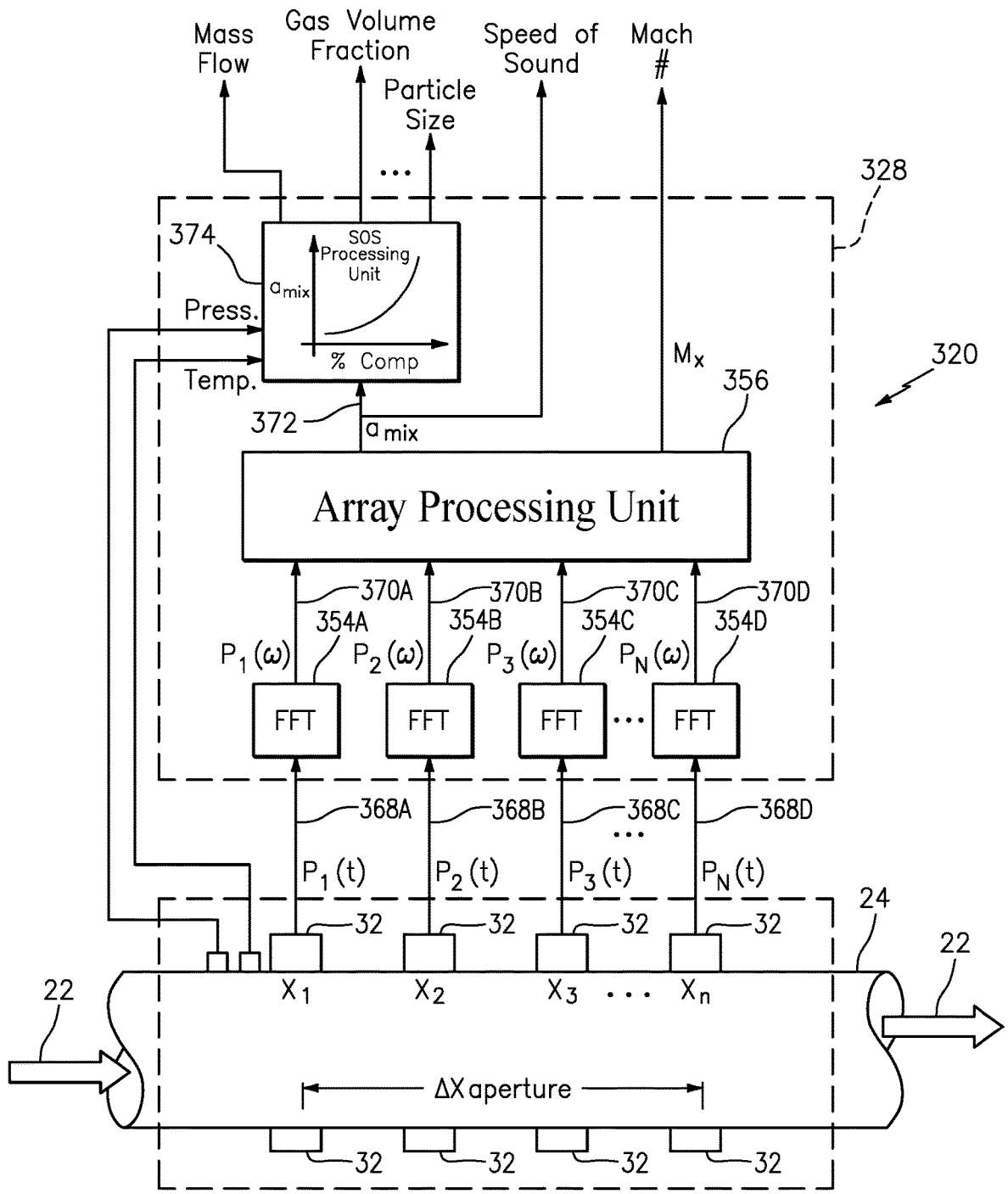
FIG. 14 is a schematic illustration of a flow meter embodiment.

Another embodiment of the present disclosure configured to determine the speed of sound propagating through the fluid flow 22 is shown in FIG. 14. The flow meter embodiment shown in FIG. 14 includes an array of MFC sensors 32, disposed at axially spaced apart locations $X_1$, $X_2$, $X_3$, and $X_N$. The MFC sensors 32 sense for strain/pressure variations and produce time-varying signals $P_1(t)$, $P_2(t)$, $P_3(t)$, ... $P_N(t)$ on lines 368A-368D to the processing unit 328. The processing unit 328 includes Fast Fourier Transform (FFT) logics 354A-354D that calculate the Fourier transform of the time-based input signals $P_1(t)$-$P_N(t)$ and provide complex frequency domain (or frequency based) signals $P_1(\omega)$, $P_2(\omega)$, $P_3(\omega)$ ... $P_N(\omega)$ on lines 370A-370D indicative of the frequency content of the input signals. Instead of FFT's, any other technique for obtaining the frequency domain characteristics of the signals $P_1(t)$-$P_N(t)$, may be used. For example, the cross-spectral density and the power spectral density may be used to form a frequency domain transfer functions (or frequency response or ratios) discussed hereinafter.

The frequency signals $P_1(\omega)$-$P_N(\omega)$ are fed to an array processing unit 356 which provides a signal to line 372 indicative of the speed of sound of the mixture $a_{mix}$. The $a_{mix}$ signal is provided to an entrained gas processing unit 374, similar to the SOS processing unit 257, which converts $a_{mix}$ to a percent composition of a mixture and provides a gas volume fraction or % Comp signal.

The data from the array of sensors 32 may be processed in any domain, including the frequency/spatial domain, the temporal/spatial domain, the temporal/wave-number domain or the wave-number/frequency (k-ω) domain. As such, any known array processing technique in any of these or other related domains may be used if desired, similar to the techniques used in the fields of SONAR and RADAR.

Figure 15:
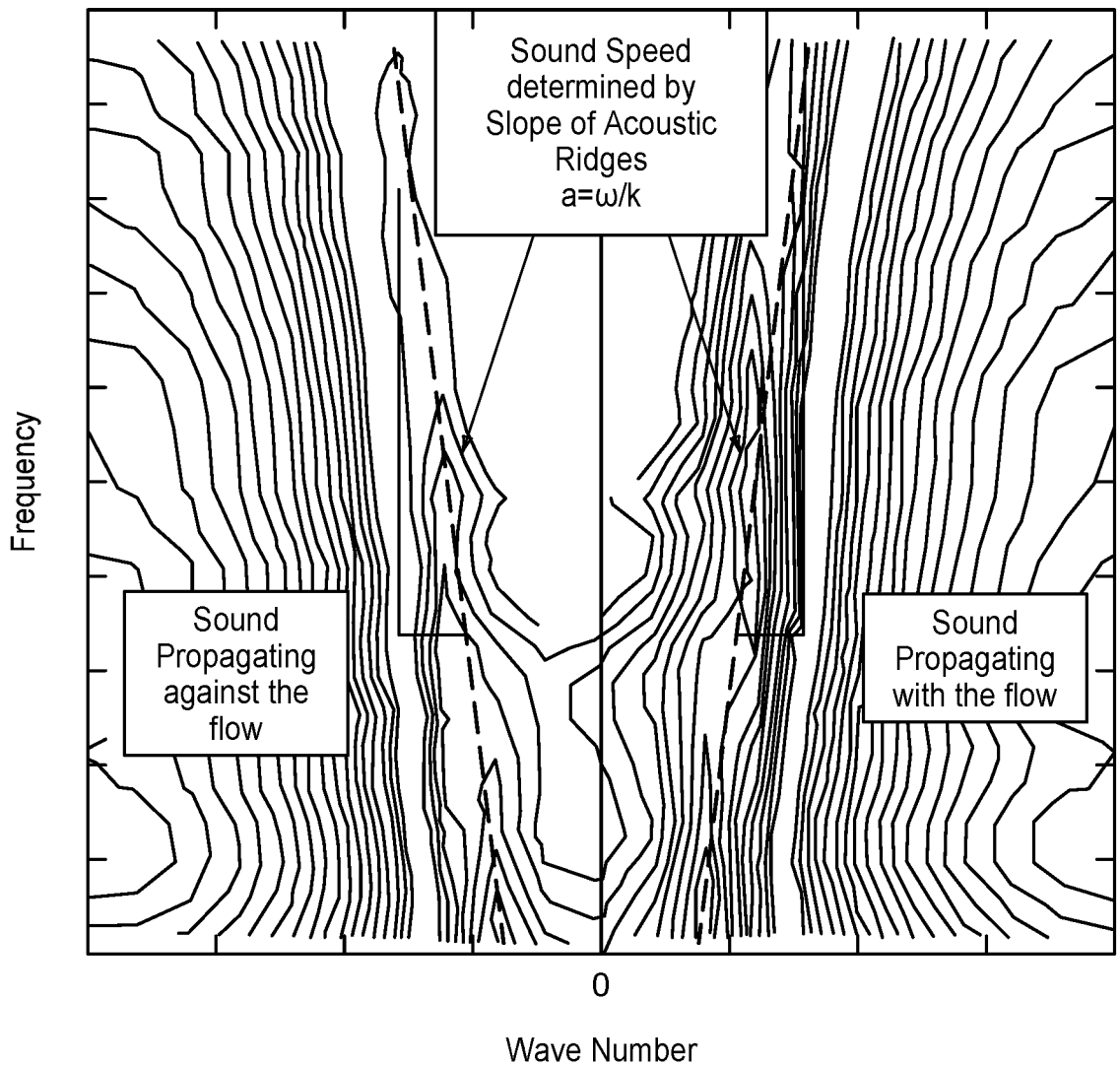
FIG. 15 a k-ω plot of data that illustrates slope of the acoustic ridges traveling in both directions of the pipe.

One such technique of determining the speed of sound propagating through the flow 22 is using array processing techniques to define an acoustic ridge in the k-ω plane as shown in FIG. 15. The slope of the acoustic ridge is indicative of the speed of sound propagating through the flow 22. This technique is similar to that described in U.S. Pat. No. 6,587,798, which is incorporated herein by reference. The speed of sound (SOS) is determined by applying SONAR array processing techniques to determine the speed at which the one dimensional acoustic waves propagate past the axial array of unsteady pressure measurements distributed along the pipe 24.

The processing unit 328 performs a Fast Fourier Transform (FFT) of the time-based pressure signals $P_1(t)$-$P_N(t)$ to convert the pressure signal into the frequency domain. The power of the frequency-domain pressure signals are then determined and defined in the k-ω plane by using array processing algorithms (such as Capon and Music algorithms). The acoustic ridge in the k-ω plane, as shown in the k-ω plot of FIG. 15, is then determined. The speed of sound (SOS) is determined by measuring slope of the acoustic ridge. The gas volume fraction is then calculated or otherwise determined, as described hereinafter.

Figure 16:
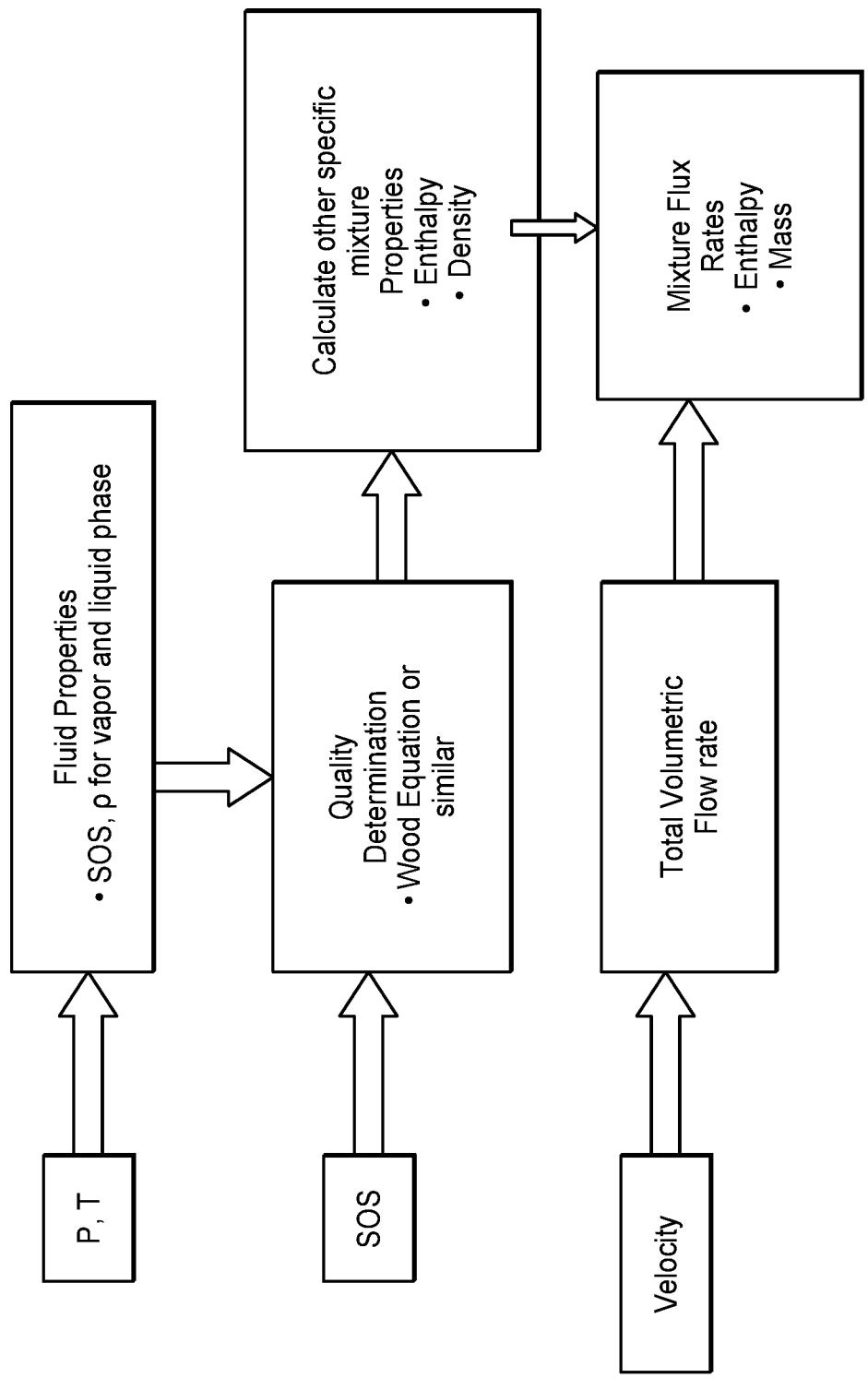
FIG. 16 is a functional diagram of an apparatus embodying the present invention.

The flow meter of the present invention uses known array processing techniques, in particular the Minimum Variance, Distortionless Response, or other adaptive array processing techniques (MVDR, Music, or Capon technique), to identify pressure fluctuations, which convect with the materials flowing in a conduit and accurately ascertain the velocity, and thus the flow rate, of said material. These processing techniques utilize the covariance between multiple sensors 32 at a plurality of frequencies to identify signals that behave according to a given assumed model; e.g., in the case of the apparatus 320, a model, which represents pressure variations convecting at a constant speed across the sensors comprising the flow meter sensing device 26. FIG. 16 illustrates flow diagram representative of the apparatus 320 of FIG. 14.

Although the invention has been described and illustrated with respect to exemplary embodiments thereof, the foregoing and various other additions and omissions may be made therein and thereto without departing from the spirit and scope of the present invention.

What is claimed:

1. An apparatus for measuring a parameter of a fluid flow passing within a pipe, the pipe having an outer radial surface, a radius, and a circumference, the apparatus comprising:
   a sensing device having a sensor array, the sensor array including at least one first macro fiber composite (MFC) strain sensor disposed at a first axial position, and at least one second MFC strain sensor disposed at a second axial position, which said first axial position and said second axial position are spaced apart from one another, and the at least one first MFC strain sensor and at least one second MFC strain sensor are both configured to produce signals representative of pressure variations of the fluid flow passing within the pipe;
   wherein each first MFC sensor and each second MFC sensor has a first sensitivity along a first axis and a second sensitivity along a second axis, which second axis is orthogonal to the first axis, and the second sensitivity is substantially less than the first sensitivity; and
   wherein the at least one first MFC strain sensor is disposed in a first laminate body that includes a stack of layers, and the first laminate body has a neutral axis that extends parallel to the first axis of the at least one first MFC strain sensor, and the at least one second MFC strain sensor is disposed in a second laminate body that includes a stack of layers, and the second laminate body has a neutral axis that extends parallel to the first axis of the at least one second MFC strain sensor; and
   wherein the sensing device is configured for attachment to the pipe outer radial surface so that the at least one first MFC strain sensor and the at least one second MFC strain sensor each have their respective first axis substantially aligned with the circumference of the pipe, and the first laminate body and the second laminate body are disposed in a curved configuration with their respective first axis extending concentrically with the outer radial surface of the pipe; and
   wherein the at least one first MFC strain sensor is disposed in the first laminate body between the neutral axis of the first laminate body and the pipe outer radial surface and the at least one second MFC strain sensor is disposed in the second laminate body between the neutral axis of the second laminate body and the pipe outer radial surface and the at least one first MFC strain sensor and the at least one second MFC strain sensor are maintained in compressive strain as a result of their respective curved configuration; and a processing unit configured to receive the signals from the at least one first MFC strain sensor and the at least one second MFC strain sensor sensing device, and measure the fluid flow parameter based on the signals.

2. The apparatus of claim 1, wherein the sensing device includes a strap unit disposed radially outside of the array of sensors.

3. The apparatus of claim 2, wherein the sensing device includes an adhesive operable to attach the first laminate body of the at least one first MFC strain sensor and the second laminate body of the at least one second MFC strain sensor to a surface of the strap unit.

4. The apparatus of claim 3, wherein the strap unit is configured to clamp the sensing device to the pipe outer radial surface.

5. The apparatus of claim 1, wherein the sensing device includes an adhesive operable to attach the first laminate body of the at least one first MFC strain sensor and the second laminate body of the at least one second MFC strain sensor to the pipe outer radial surface.

6. The apparatus of claim 1, wherein the first laminate body of the at least one first MFC strain sensor and the second laminate body of the at least one second MFC strain sensor each include an inner most layer, and the sensing device is configured for attachment to the pipe outer radial surface so that the inner most layer is contiguous with the pipe outer radial surface, and the sensing device is configured so that the inner most layer is releasable from the pipe outer radial surface with the sensing device in an undamaged form.

* * * * *